United States Patent
Altendorfer et al.

(10) Patent No.: US 9,975,558 B2
(45) Date of Patent: May 22, 2018

(54) CONTROL SYSTEM AND CONTROL METHOD FOR SELECTING AND TRACKING A MOTOR VEHICLE

(71) Applicant: Lucas Automotive GmbH, Koblanz (DE)

(72) Inventors: Richard Altendorfer, Koblenz (DE); Bjoem Oska, Koblenz (DE)

(73) Assignee: Lucas Automotive GmbH (DE)

( * ) Notice: Subject to any disclaimer, the term of this patent is extended or adjusted under 35 U.S.C. 154(b) by 0 days. days.

(21) Appl. No.: 15/659,658

(22) Filed: Jul. 26, 2017

(65) Prior Publication Data
US 2018/0029602 A1    Feb. 1, 2018

(30) Foreign Application Priority Data
Aug. 1, 2016  (DE) .................. 10 2016 009 305

(51) Int. Cl.
*B60W 40/04* (2006.01)
*B60W 40/105* (2012.01)

(52) U.S. Cl.
CPC .......... *B60W 40/04* (2013.01); *B60W 40/105* (2013.01); *B60W 2550/30* (2013.01); *B60W 2750/30* (2013.01)

(58) Field of Classification Search
CPC . B60W 40/04; B60W 40/105; B60W 2750/30
See application file for complete search history.

(56) References Cited

U.S. PATENT DOCUMENTS

| 2008/0033647 A1* | 2/2008 | Milark | G01S 15/18 701/300 |
| 2014/0104077 A1* | 4/2014 | Engel | G08G 1/0962 340/901 |
| 2014/0156164 A1* | 6/2014 | Schuberth | B60W 30/143 701/96 |

* cited by examiner

Primary Examiner — Richard M Camby
(74) Attorney, Agent, or Firm — Tarolli, Sundheim, Covell & Tummino LLP

(57) ABSTRACT

The present invention describes a control system, which is adapted and determined to identify motor vehicles driving in front. The control system is at least adapted and determined to detect another motor vehicle participating in the traffic with the at least one environmental sensor. The control system is at least adapted and determined to determine positions of the other motor vehicle for a predetermined time interval. The control system is at least adapted and determined to determine at the end of the time interval whether
a) a current position of the own motor vehicle lies ahead of at least one of the determined positions of the other motor vehicle;
b) a lateral distance between a respectively next position of the determined positions of the other motor vehicle ahead of and behind the current position of the own motor vehicle does not exceed a predetermined value; and
c) a number of the determined positions of the other motor vehicle, which are located ahead of the current position of the own motor vehicle, exceeds a predetermined minimum number. The control system is at least adapted and determined to estimate a trajectory from the determined positions of the other motor vehicle if it was determined that a), b) and c) have been fulfilled. The control system is at least adapted and determined to select the other motor vehicle in order to follow this, based on a deviation measurement between the esti- (Continued)

mated trajectory of the other motor vehicle and a trajectory of the own motor vehicle.

12 Claims, 11 Drawing Sheets

CONTROL SYSTEM AND CONTROL METHOD FOR SELECTING AND TRACKING A MOTOR VEHICLE

RELATED APPLICATION

This application claims priority from German Application No. 10 2016 009 305.6, filed Aug. 1, 2016, the subject matter of which is incorporated herein by reference in its entirety.

BACKGROUND TO THE INVENTION

A control system and a method for selecting and tracking a motor vehicle are disclosed here. This system and method are based in particular on environmental sensors in motor vehicles and support the driver or an autonomously driven motor vehicle in selecting another motor vehicle participating in traffic and in tracking it on the basis of various conditions. These conditions increase the probability that the selected motor vehicle is a motor vehicle that is suitable for tracking.

PRIOR ART

Speed control in a motor vehicle, which adjusts the distance to a motor vehicle driving ahead, and an emergency brake assistant in a motor vehicle are driver assistance systems that react to other road users, such as vehicles or pedestrians, for example. For this the most relevant road user is selected to carry out a corresponding action. This so-called route selection or destination selection takes place by estimating the trajectory of the own motor vehicle and selection of the road user that is located on this trajectory. The estimation of the trajectory is generally based on the knowledge of a speed and a yaw rate of the own motor vehicle and on other information available, for example road markings. This method sometimes leads to a poor route selection or destination selection. The disadvantage lies in a great measurement noise and the assumption that the current speed and yaw rate will remain the same for the next few seconds.

Underlying Problem

The object of the present invention is to improve a route selection or destination selection of motor vehicles.

Proposed Solution

According to a first aspect, a control system is adapted and determined to identify motor vehicles driving in front. The control system is at least adapted and determined to capture another motor vehicle participating in the traffic with the at least one environmental sensor. The control system is at least adapted and determined to determine positions of the other motor vehicle for a predetermined time interval. The control system is at least adapted and determined to determine, at the end of the time interval, whether
 a) a current position of the own motor vehicle lies ahead of at least one of the determined positions of the other motor vehicle;
 b) a lateral distance between a respectively next position of the determined positions of the other motor vehicle ahead of and behind the current position of the own motor vehicle does not exceed a predetermined value; and
 c) a number of the determined positions of the other motor vehicle, which are located ahead of the current position of the own motor vehicle, exceeds a predetermined minimum number.

The control system is at least adapted and determined to estimate a trajectory from the determined positions of the other motor vehicle if it was determined that a), b) and c) have been fulfilled. The control system is at least adapted and determined to select the other motor vehicle in order to follow this, based on a deviation measurement between the estimated trajectory of the other motor vehicle and a trajectory of the own motor vehicle.

Estimating here is a determination or an approximation of the trajectory to be estimated of the other motor vehicle by interpolation of the determined positions of the other motor vehicle and/or by extrapolation in order to obtain, via the determined positions of the other motor vehicle, positions of the other motor vehicle going beyond.

The solution presented here offers the advantage that the estimated trajectory of the other motor vehicle is based on captured data. Due to this the environmental data is encumbered by less noise. Furthermore, a so-called "headway", i.e. a time looking ahead, for example in the order of 7 seconds, can be selected for the predetermined time interval, whereby it is ensured that the estimated trajectory of the other motor vehicle and the trajectory of the own motor vehicle can meet. Trajectories of other motor vehicles can further be used for the use of a traffic situation.

The current position can be a position at a time after or at the end of the predetermined time interval.

The lateral distance can be understood as a distance perpendicular to a course of a lane. A lateral distance between two points can thus be a distance between the two points perpendicular to a lane course, or to the driving direction of the own motor vehicle.

Further Configurations and Advantages Further Developments

The deviation measurement between the estimated trajectory of the other motor vehicle and the trajectory of the own motor vehicle can be below a predetermined threshold value.

The predetermined threshold value can be predetermined by a distance, a curvature and/or a course. The predetermined threshold value can be set by a maximum value for the distance, the curvature difference or the course difference. The deviation measurement can be determined by a lateral distance between the trajectories, starting out from one of the two trajectories, It is possible to fall below the deviation measurement for a minimum length of the trajectory of the own motor vehicle.

The minimum length can specify a length for which the deviation measurement falls below the predetermined threshold value. The minimum length can be a length or distance between two points, within which or between which the deviation measurement of the estimated trajectory to the own trajectory falls below the predetermined threshold value.

The minimum length can be above a predetermined threshold value based on a current distance between the own and the other motor vehicle.

The current distance between the own and the other motor vehicle can be smaller than the minimum length.

The control system can further be adapted and determined to select the participating other motor vehicle to follow this if a) a current distance between the own and the other motor vehicle falls below a predetermined threshold value;
b) the error in the estimated trajectory falls below a predetermined threshold value;
c) the curvature of the estimated trajectory falls below a predetermined threshold value; and/or
d) the relative speed between the other motor vehicle and the own motor vehicle falls below a predetermined threshold value.

The control system can further identify road boundaries and/or road markings. The at least one environmental sensor can be adapted to provide an electronic control of the control system with environmental data, which reproduces the area in front of the motor vehicle. The control system can at least be adapted and determined to capture road boundaries and/or road markings with the at least one environmental sensor. The control system can at least be adapted and determined to determine a trajectory in each case from the road boundaries and/or road markings captured. The control system can at least be adapted and determined to form pairs from the established trajectories, wherein a pair can comprise two trajectories respectively. The control system can at least be adapted and determined to determine sampling points at predetermined distances for each pair of first and second trajectories. The control system can at least be adapted and determined to determine distances, perpendicular to a course of the first trajectory, from the determined sampling points to the second trajectory, and calculate a length of a section along the course of the first trajectory, for which length the distances determined lie within a predetermined value range, and/or to determine distances, perpendicular to a course of the second trajectory, from the determined sampling points to the first trajectory, and calculate a length of a section along the course of the second trajectory, for which length the distances determined lie within the predetermined value range. The control system can at least be adapted and determined to select a set of pairs of trajectories based on a criterion for pairing to determine at least one lane and/or at least one trajectory for the motor vehicle based on this set.

The advantage of this proposed solution lies in the ability to take longer pictures of read boundaries and/or road markings instead of only recording a current position of a road user or paid indications. The trajectories have an intuitive significance as one-dimensional linear structures and their similarity or parallelism can be calculated by mathematical methods. In addition, a basis can be created from the individual trajectories for being able to calculate situation-dependent models, which can be reverted to later in similar driving situations as a consequence of training data.

The predetermined value range can be selected so that the distances between the two trajectories of a pair run substantially parallel, it is also conceivable for a greater value range to be determined.

The criterion for forming pairs can be a length, a distance, a curvature and/or a course of the trajectories.

The sections of the first and second trajectory can be preset by a field of vision of the at least one environmental sensor.

The criterion for forming pairs can be the two calculated lengths of the sections of the first and the second trajectory of each pair.

The criterion for forming pairs can be a maximum that is determined from the two calculated lengths of the sections of the first and the second trajectory of each pair.

The criterion for forming pairs can be a mean value or a standard deviation, which is determined from the two lengths of the sections of the first and the second trajectory of each pair.

The mean value and/or the standard deviation of each pair can be used to select the associated pair on the basis of the greatest mean value or the smallest standard deviation.

Only trajectories that have a predetermined minimum length can be used for forming pairs.

The control system can at least be adapted and determined to detect other motor vehicles participating in the traffic ahead of the own motor vehicle with the at least one environmental sensor. The control system can at least be adapted and determined to determine a respective position of the other motor vehicles with the at least one environmental sensor. The control system can at least be adapted and determined to determine a trajectory of the own motor vehicle from a current speed and a current yaw rate of the own motor vehicle. The control system can at least be adapted and determined to select a single motor vehicle from the other motor vehicles that has the shortest distance to the trajectory, in order to follow this single motor vehicle with the own motor vehicle.

The advantage of this solution lies in the evaluation of the shortest distance between the other motor vehicle and the trajectory of the own motor vehicle, which gives an indication of how suitable the selection of the single motor vehicle is.

The trajectory can be determined by integration of the speed and the yaw rate over a predetermined time.

The control system can further be adapted and determined to detect a relative distance between the own motor vehicle and the single motor vehicle. The control system can further be adapted and determined to adjust the distance between the own motor vehicle and the single motor vehicle according to a traffic situation.

The control system can further be adapted and determined to compare the respective shortest distance of the other motor vehicles to the trajectory of the own motor vehicle with the shortest distance of the single motor vehicle to the trajectory of the own motor vehicle. The control system can further be adapted and determined, if the comparison reveals that another motor vehicle is located closer to the trajectory, to select this in order to follow this and to save the single motor vehicle previously selected for possible selection later.

Possible selection later makes it possible to rectify a possible incorrect selection more quickly later. This saving makes it possible for a user or for the system to mark the motor vehicle as suitable in a subsequent selection or to follow it.

The control system can further be adapted and determined to process a manual input of a user, wherein the single motor vehicle is deselected by the selection of one of the other motor vehicles, in order to follow this.

Deselection helps the driver to find a remedy himself in the event of a wrong choice of the system or to select another desired route, following the other motor vehicle, which route was not originally envisaged for the journey.

The control system can be formed so that the control system can decide whether the manual input of the user is permissible.

Another aspect relates to a control method, which in a motor vehicle identifies vehicles driving in front based on environmental data obtained by at least one environmental sensor associated with the motor vehicle. The method has the following steps:

providing an electronic control in the own motor vehicle by means of the environmental sensors with environmental data reproducing the area in front of the motor vehicle, detecting another motor vehicle participating in traffic with the at least one environmental sensor, determining positions of the other motor vehicle for a predetermined time interval, determining at the end of the time interval whether
a) a current position of the own motor vehicle lies ahead of at least one of the determined positions of the other motor vehicle;
b) a lateral distance between a respectively next position of the determined positions of the other motor vehicle ahead of and behind the current position of the own motor vehicle does not exceed a predetermined value; and
c) a number of the determined positions of the other motor vehicle, which are located ahead of the current position of the own motor vehicle, exceeds a predetermined minimum number;

if it was determined that a), b) and c) have been fulfilled, estimating a trajectory from the determined positions of the other motor vehicle, and selecting the other motor vehicle in order to follow this based on a deviation measurement between the estimated trajectory of the other motor vehicle and a trajectory of the own motor vehicle.

Even if some of the aspects described above were described in reference to the control system, these aspects can also apply to the control method. Likewise the aspects described above in reference to the control method can apply in a corresponding manner to the control system.

BRIEF DESCRIPTION OF DRAWINGS

The present invention is to be explained below with reference to figures. These figures show schematically.

The method variants described here and their functional and operational aspects serve only for a better understanding of their structure, mode of functioning and properties; they do not restrict the disclosure to the exemplary embodiments, for example. The figures are partly schematic, wherein substantial properties and effects are shown in part considerably enlarged in order to clarify the functions, active principles, technical configurations and features. Every mode of functioning, every principle, every technical configuration and every feature which is/are disclosed in the figures or in the text can be combined freely and in any way with all claims, every feature in the text and in the other figures, other modes of functioning, principles, technical configurations and features that are contained in or result from this disclosure so that all conceivable combinations are to be associated with the devices described. Combinations between all individual implementations in the text, meaning in each section of the description, in the claims and also combinations between different variants in the text, in the claims and in the figures are also comprised here and can be made the subject of further claims. Even the claims do not limit the disclosure and thus the combination options of all features demonstrated with one another. All disclosed features are explicitly also disclosed here individually and in combination with all other features.

DETAILED DESCRIPTION OF THE DRAWINGS

Figure 1:
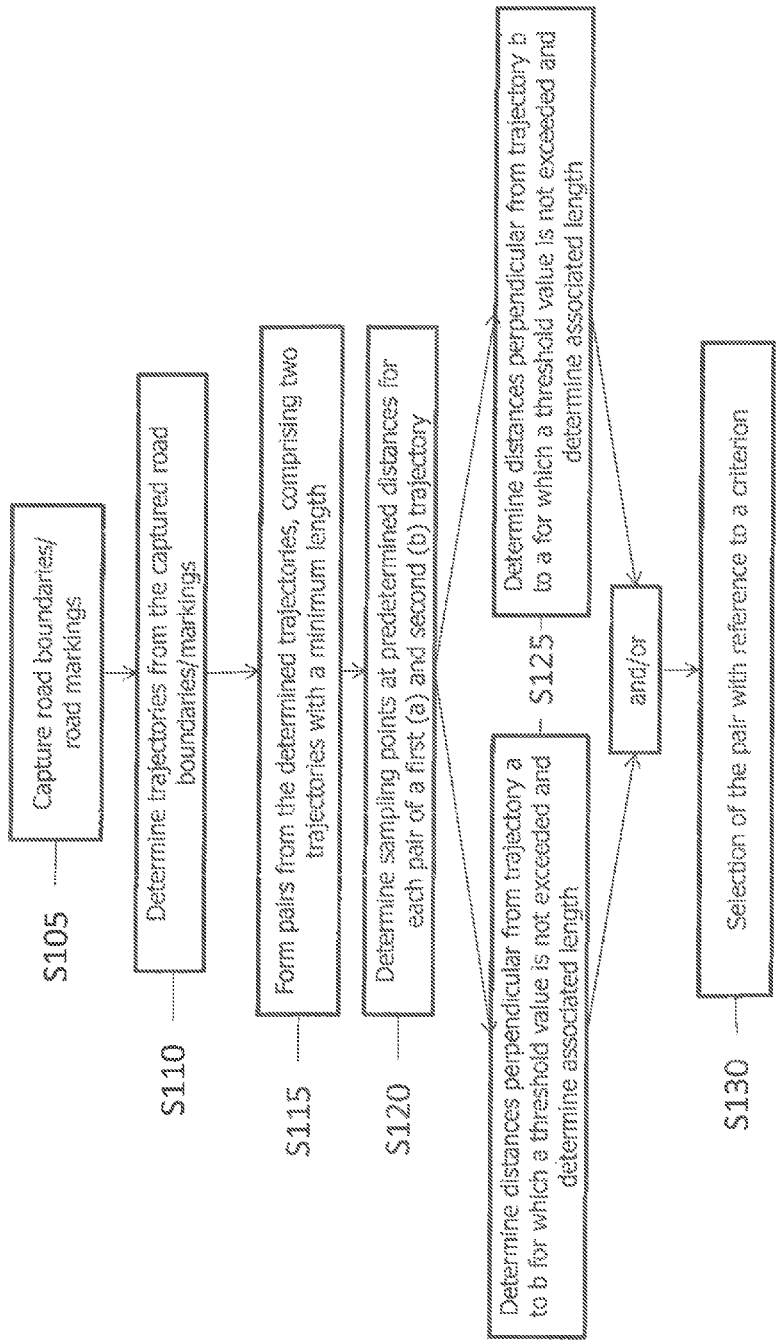
FIG. 1 a schematic representation of a flow chart according to an exemplary embodiment of the present invention.

FIG. 1 shows a schematic representation of a flow chart according to an exemplary embodiment of the present invention. First environmental data is captured by the system via the environmental sensors, S105. The environmental data comprises road boundaries and road markings. The road boundaries and road markings are then used to determine trajectories from them, S110. The road boundaries and road markings supply information such as line structures and path information, which are used for trajectory forming. Not only white road markings but also distance posts at road edges are used for this. Pairs are now formed from the trajectories, S115. The trajectories must have a minimum length in this case, if a trajectory does not have this minimum length, for example if there are only a few distance posts or line markings that are too short, this trajectory is not taken into account for forming pairs. For each pair of first and second trajectories, sampling points are determined at predetermined distances, S120. Since the underlying distance test method is not symmetrical, one of the two methods can be used below or both to improve the results. Distances can be determined respectively from the first to the second trajectory of each pair and/or distances from the second to the first trajectory of each pair, S125. An associated length of a section along the first and/or the second trajectory can be calculated respectively, for which length the distances He within a predetermined value range. Following the step of determination, a pair is selected based on a criterion, in order to select a lane for the motor vehicle based on this pair. The two calculated lengths can be the criterion. The criterion can also be a maximum. The maximum is determined in this case so that the calculated lengths of the sections of the first and second trajectory of each pair have the greatest length. The criterion can also be a mean value. The mean value is then determined by two lengths of the sections of the first and the second trajectory of each pair. The mean value of each pair can then be compared with one another to select the pair with the greatest mean value. To visualise the method, a scenario is represented schematically in FIGS. 2 and 3.

Figure 2:
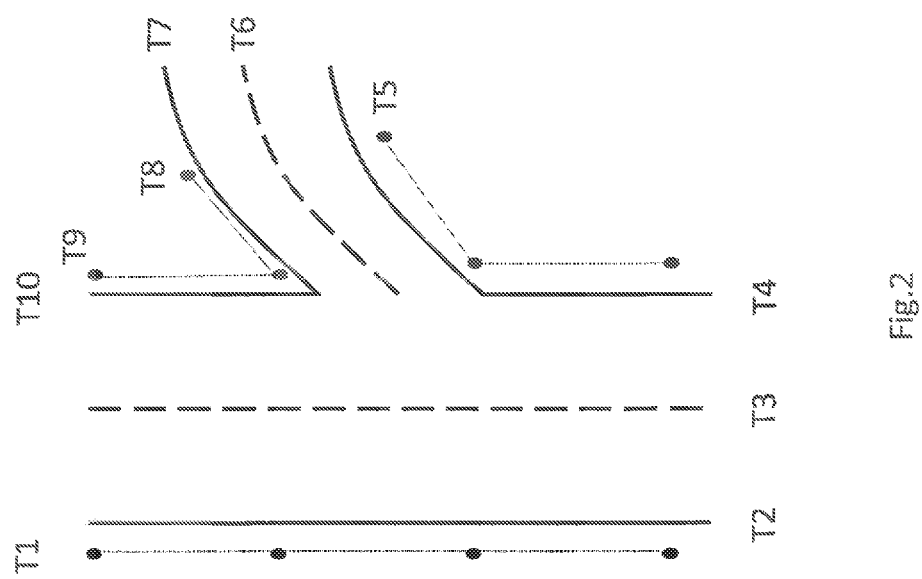
FIG. 2 a schematic representation of lanes with associated road boundaries and road markings.

FIG. 2 shows a schematic representation of lanes with associated road boundaries and road markings. In FIG. 2 road boundaries and continuous and broken lines are represented according to a well-known road situation. The road markings and the road boundaries supply information about possible trajectories T1 to T10. These trajectories are indicated schematically as continuous or broken lines. In this case all trajectories can be combined with one another, wherein this combination can specify a road. This road can then be determined from this combination, here termed pair. For example, the pairs T1 and T3 form the left-hand lane of the road situation. For the right-band lane several possibilities result, for example T2 with T4 and T10, and T3 with T4 and T10. T5 with T8 or T4 with T7 would be considered for the turning-off curve. A selection situation in which a suitable lane is to be selected is shown schematically in FIG. 3.

Figure 3:
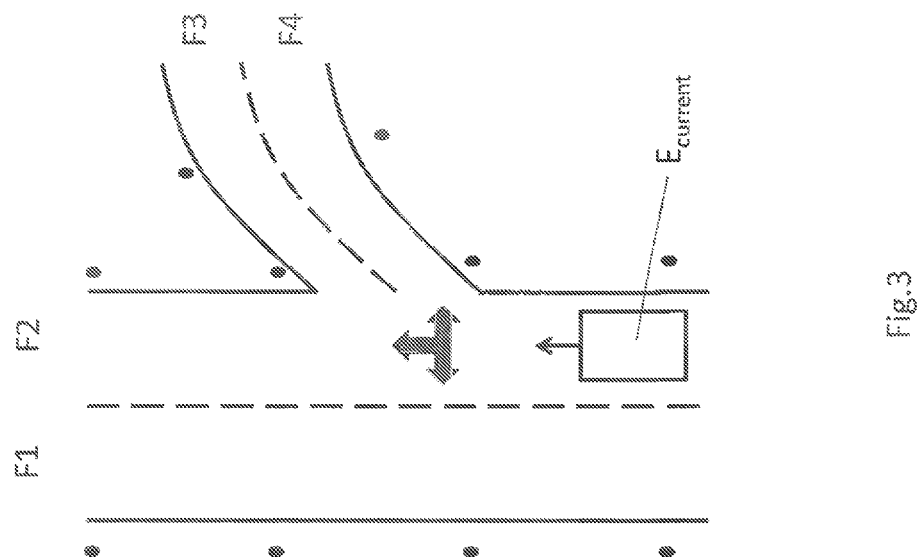
FIG. 3 a schematic representation of a driving situation for the selection of a lane with corresponding road boundaries and road markings.

FIG. 3 shows a schematic representation of a driving situation for the selection of a lane with corresponding road boundaries and road markings. The lanes F1 to F4 are accessible to the motor vehicle E_cur shown in black. The environmental sensors capture the area in the driving direction forwards in an area in front of the motor vehicle. This viewing direction of the environmental sensors supplies the lanes F1 to F4 according to the exemplary embodiment in FIG. 1. To select a suitable lane, reference is made to situation-dependent circumstances, which indicate whether to turn off to the right, for example, if this selection appears to make little sense, F3 and F4 are not taken into account in the determination of a suitable lane. The lanes F1 and F2 accordingly form logical lanes and are taken into account for the selection.

Figure 4:
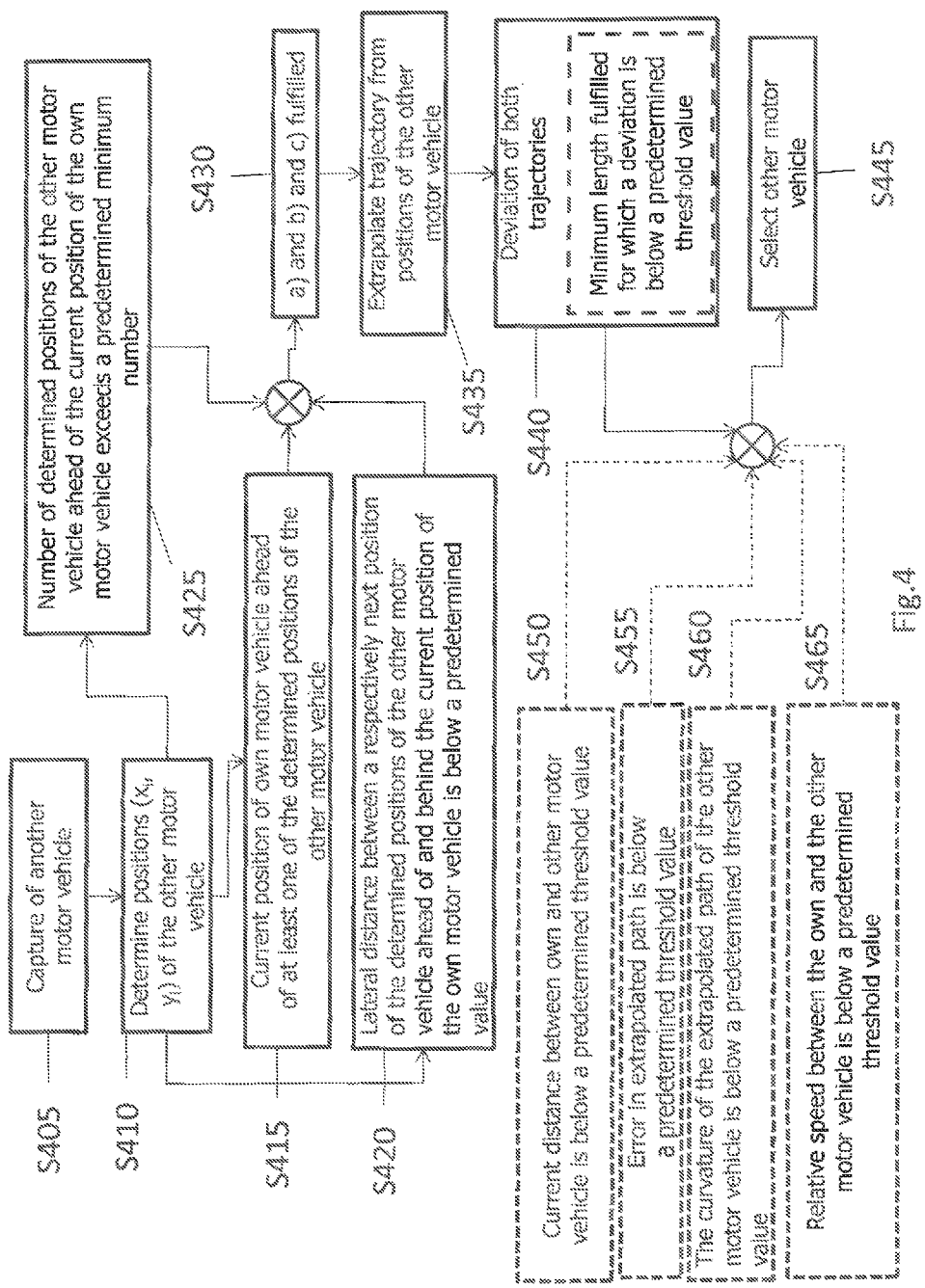
FIG. 4 a schematic representation of a flow chart according to an exemplary embodiment of the present invention.

FIG. 4 shows a schematic representation of a flow diagram according to an exemplary embodiment of the present invention. Another motor vehicle participating in the traffic is registered by the environmental sensors, S405. Then positions of the other motor vehicle are determined for a predetermined time interval, S410. At the end of the time interval it is determined whether a current position of the own motor vehicle lies ahead of at least one of the determined positions of the other motor vehicle, S415. It is further determined whether a lateral distance between a respectively next position of the determined positions of the other motor vehicle ahead of and behind the current position of the own motor vehicle does not exceed a predetermined value, S420. It is further determined whether a number of the determined positions of the other motor vehicle, which are located ahead of the current position of the own motor vehicle, exceeds a predetermined minimum number, S425. If these conditions are fulfilled, S430, a trajectory is estimated from the determined positions of the other motor vehicle, S435. Then the other motor vehicle is selected and this is followed, S445. The selection is based on a deviation S440 between the estimated trajectory and a trajectory of the own motor vehicle. The current position can be a position at a time after or at the end of the predetermined time interval. The lateral distance can be understood as a distance perpendicular to a course of a lane. A lateral distance between two points can thus be a distance between the two points perpendicular to a lane course, or to the driving direction of the own motor vehicle. The deviation between the estimated trajectory and the trajectory of the own motor vehicle can be below a predetermined threshold value. The predetermined threshold value can be predetermined by a distance, a curvature and/or a course. The predetermined threshold value can be defined by a maximum value for the distance, the curvature difference or the course difference. The deviation can be determined by a lateral distance between the trajectories, starting out from one of the two trajectories. It is possible to fall below the deviation for a minimum length of the trajectory of the own vehicle.

The minimum length can indicate a length for which the deviation fails below the predetermined threshold value. The minimum length can be a length or distance between two points, within which or between which the deviation of the estimated trajectory from the own trajectory is below the predetermined threshold value. The minimum length can be above a predetermined threshold value based on a current distance between the own and the other motor vehicle. The current distance between the own and the other motor vehicle can be smaller than the minimum length. Optionally, S450, the selection can be based on a current distance between the own and the other motor vehicle, which is to be below a predetermined threshold value. Optionally, S455, the selection can be based on an error in the estimated trajectory, which is to be below a predetermined threshold value. Optionally, S460, the selection can be based on a curvature of the estimated trajectory that is to be below a predetermined threshold value. Optionally, S465, the selection can also be based on a relative speed between the other motor vehicle and the own motor vehicle, which is to be below a predetermined threshold value.

Figure 5:
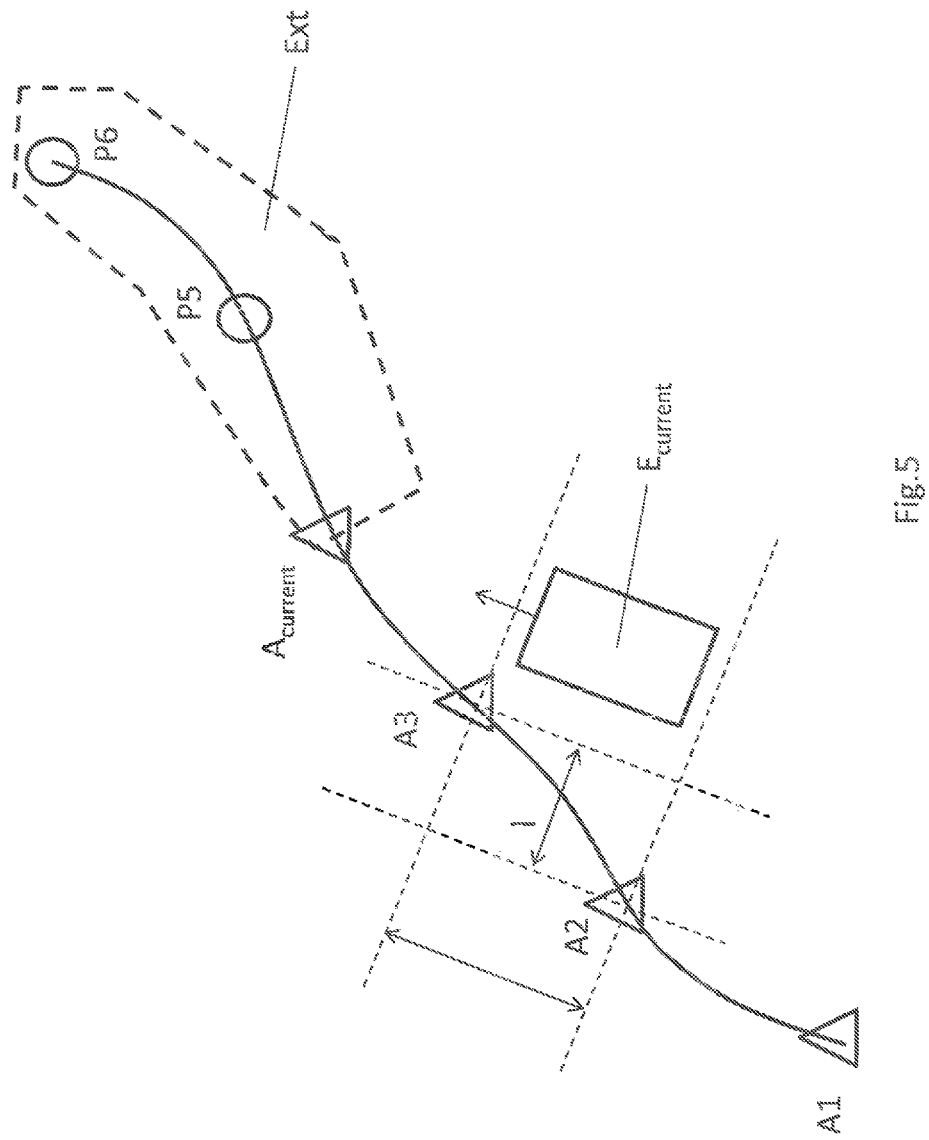
FIG. 5 a schematic representation of a driving situation with an own motor vehicle and another motor vehicle with interpolation points and an estimated trajectory of the other motor vehicle.

FIG. 5 shows a schematic representation of a driving situation with an own motor vehicle and another motor vehicle with interpolation points and an estimated trajectory of the other motor vehicle. The triangles A1, A2, A3 and $A_{current}$ represent positions of another motor vehicle. $E_{current}$ and $A_{current}$ represent current positions of an own and the other motor vehicle. Ext represents an estimation region, in which the points P5 and P6 lie, which represent points on the estimation curve, the so-called estimated trajectory, d and l in this context represent a distance between two calculated positions A2 and A3 of the other motor vehicle from the perspective of a coordinate system of the own motor vehicle. l represents the lateral distance between A2 and A3, which should not exceed a predetermined value, d represents the longitudinal distance between A2 and A3. The illustration here shows schematically that a current position of the own motor vehicle can lie between two determined positions of the other motor vehicle, which were determined at an earlier point in time. Starting out from the points A1 to $A_{current}$, the estimated trajectory is calculated using points P5 and P6. Which condition should preferably be fulfilled so that the other motor vehicle is selected by the own motor vehicle is shown in FIG. 6.

Figure 6:
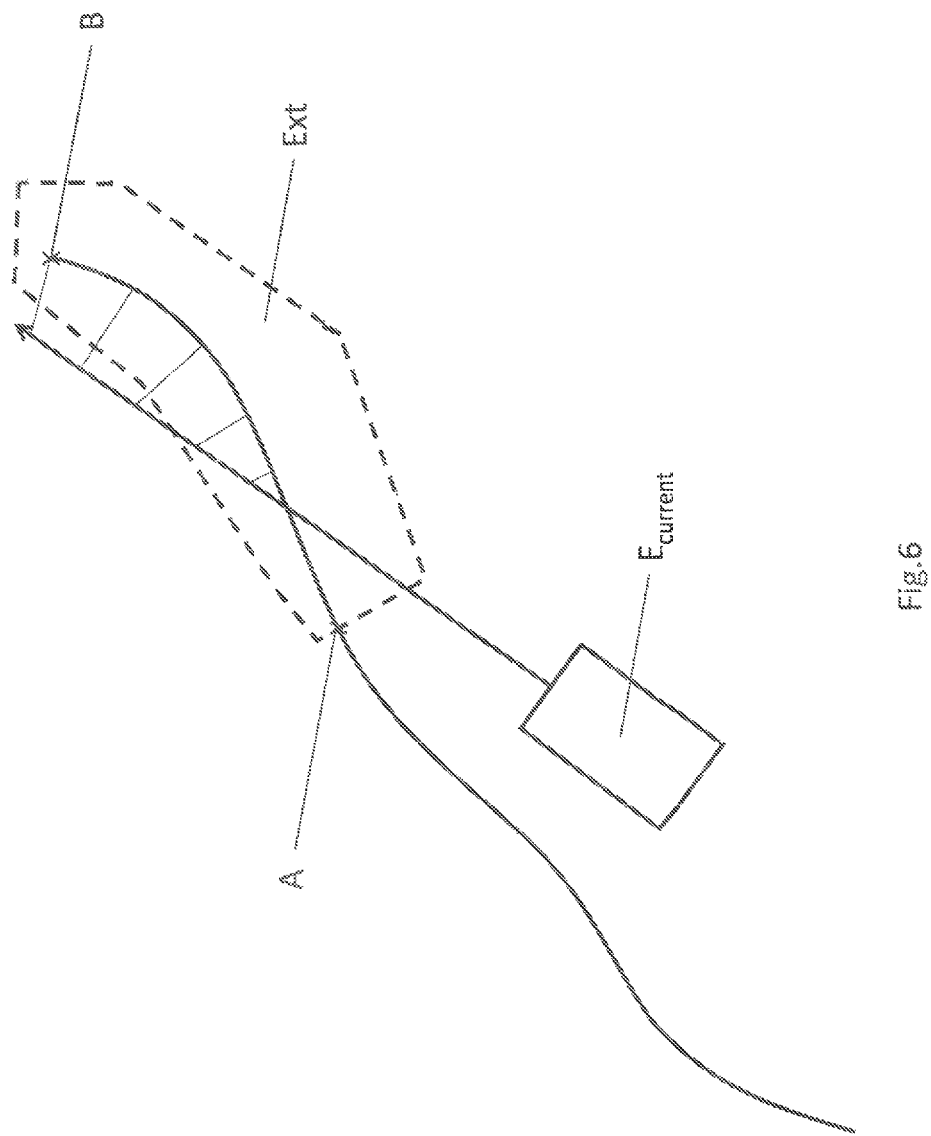
FIG. 6 a schematic representation of a deviation between one trajectory of the own motor vehicle and the trajectory of the other motor vehicle.

FIG. 6 shows a schematic representation of a deviation between one trajectory of the own motor vehicle and the trajectory of the other motor vehicle. Point A and point B of the estimated trajectory of the other motor vehicle represent a route for which a deviation between the estimated trajectory and the trajectory of the own motor vehicle lies within a predetermined threshold value, in this case the deviation could be based on a curvature of the estimated curve. Indicated by the greater curvature of the estimated trajectory in contrast to the estimated trajectory of the own motor vehicle. Here the distance between the estimated trajectory and the trajectory of the own motor vehicle is indicated by lines. This distance can be used as a criterion for the selection of the estimated trajectory. The length up to which the deviation lies within the predetermined threshold value is determined and compared with other trajectories and/or if the length is a minimum length, the associated other motor vehicle is selected. Another criterion for the selection of another motor vehicle is shown schematically in FIG. 7.

Figure 7:
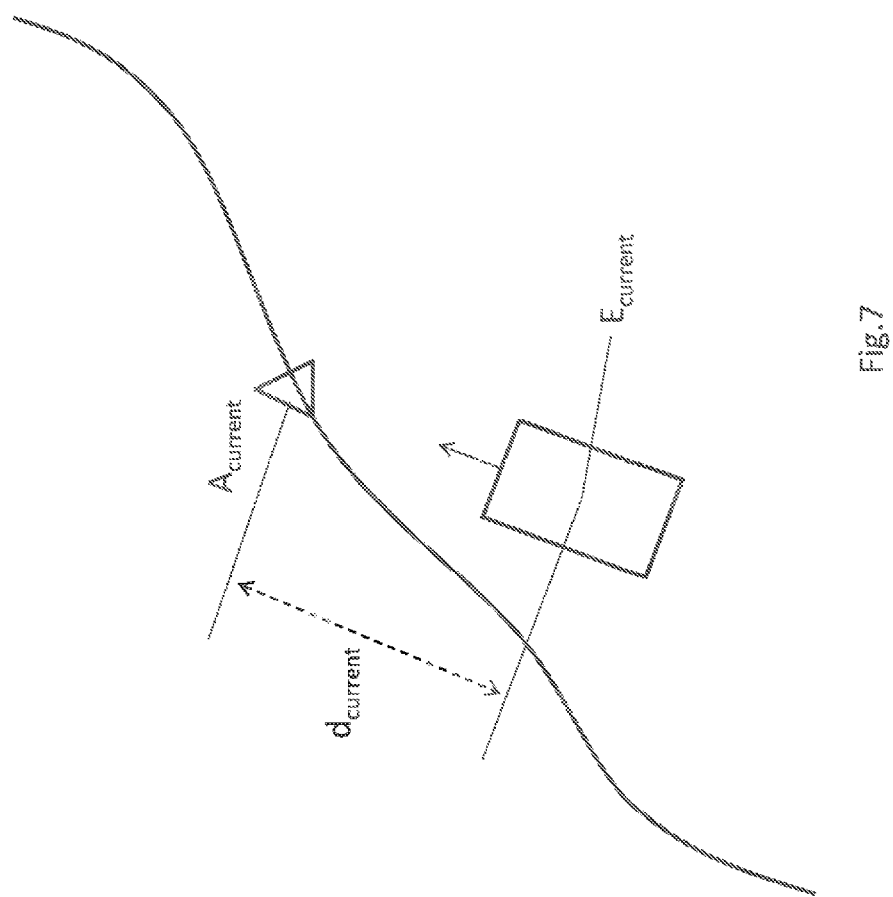
FIG. 7 a schematic representation of a current distance between a position of the own motor vehicle and the position of the other motor vehicle.

FIG. 7 shows a schematic representation of a current distance $d_{current}$ between a position of the own motor vehicle $E_{current}$ and the position of the other motor vehicle $A_{current}$. It is easy to present that in the event of too great a distance between $E_{current}$ and $A_{current}$, the associated other motor vehicle is not suitable for selection and following. Thus if the current distance $d_{current}$ does not fulfil the optional condition of being below a threshold value, the other motor vehicle is not provided for selection.

Figure 8:
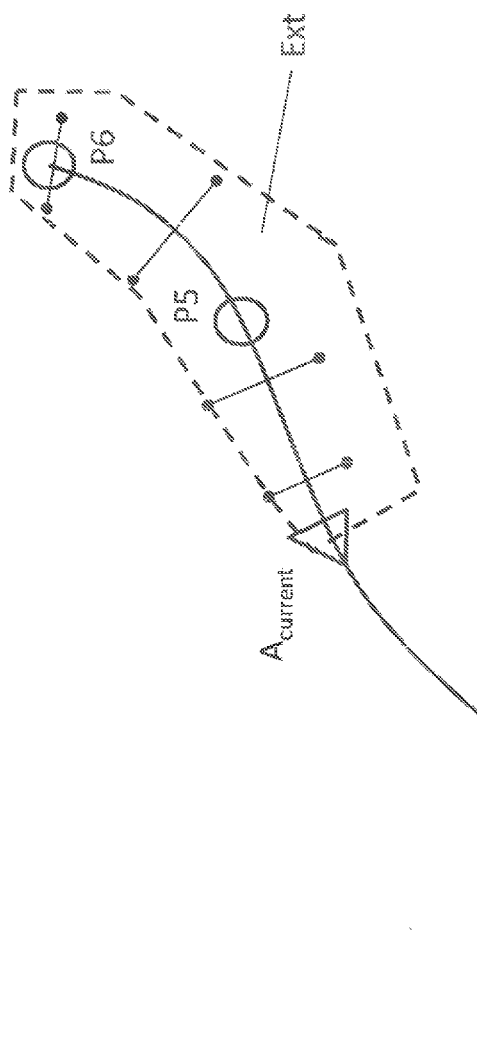
FIG. 8 a schematic representation of an error in the estimated trajectory of the other motor vehicle.

FIG. 8 shows a schematic representation of an error in the estimated trajectory of the other motor vehicle. The black transverse lines in the estimation area Ext represent an error in the estimated curve. If this error is within a predetermined value range, the estimated curve can be taken into account for a selection of the other motor vehicle. Another optional condition for the selection of the other motor vehicle is represented schematically in FIG. 9.

Figure 9:
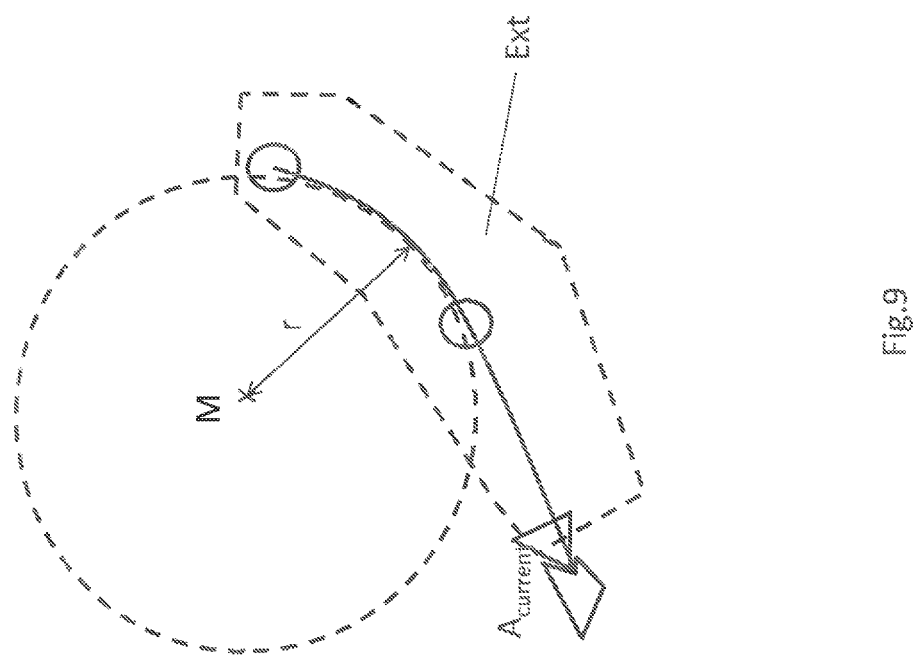
FIG. 9 a schematic representation of a curvature of the estimated trajectory of the other motor vehicle with reference to a circle of curvature.

FIG. 9 shows a schematic representation of a curvature of the estimated trajectory of the other motor vehicle with reference to a circle of curvature. The circle of curvature is schematically defined here by the point M and the radius r. The circle of curvature M is drawn at the point of the greatest curvature of the estimated trajectory of the other motor vehicle. If the radius r is below a predetermined value, the estimated trajectory is unsuitable and correspondingly the selection of the other motor vehicle. The small radius of curvature is equivalent to a large curvature of the estimated curve. Another optional condition for the selection of the other motor vehicle is given in FIG. 10.

Figure 10:
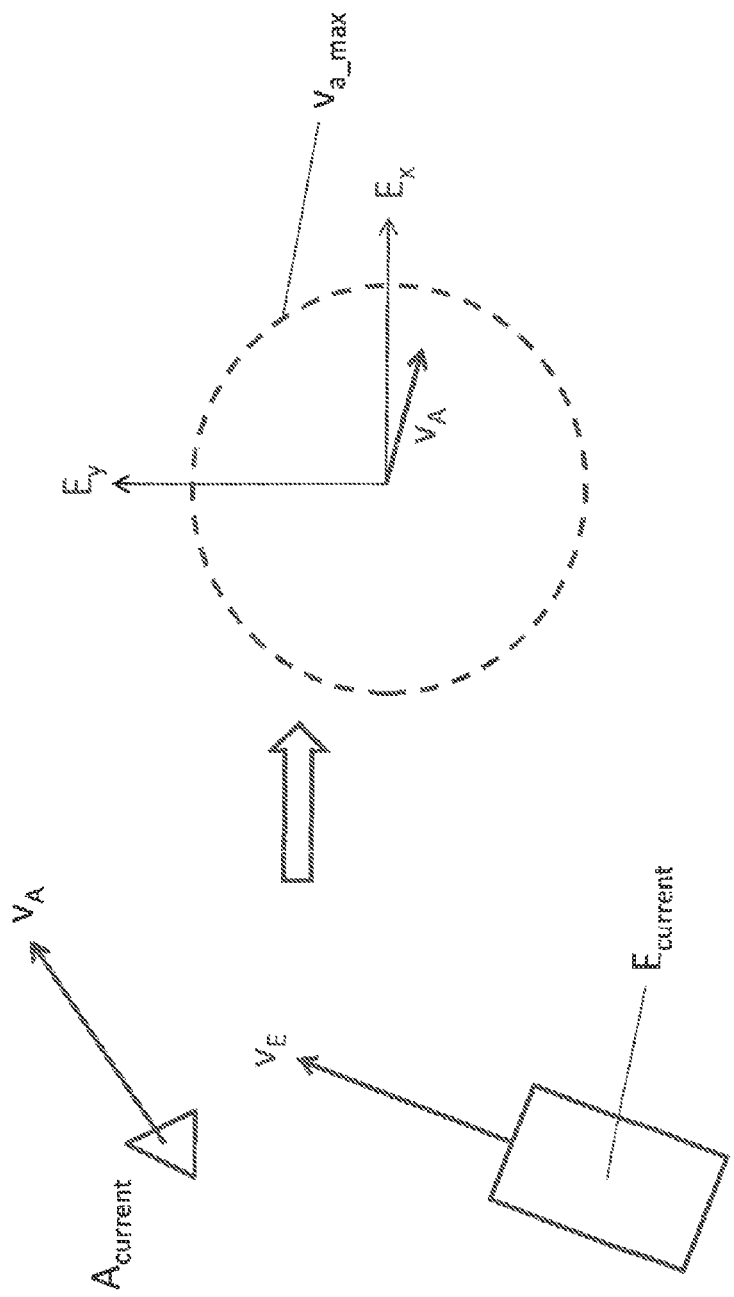
FIG. 10 a schematic representation of a relative speed between the own and the other motor vehicle.

FIG. 10 shows a schematic representation of a relative speed between the own and the other motor vehicle. A current position of the own vehicle $E_{current}$ and its current speed $v_E$ are shown schematically. A current position of the other motor vehicle $A_{current}$ and its current speed $v_A$ are also represented schematically. On the right-hand side of FIG. 10, a coordinate system is shown from the perspective of the own vehicle. In this, $E_y$ forms the direction of travel and $E_x$ forms the lateral direction starling out from a reference point of the own motor vehicle. The circle $v_{a\_max}$ illustrates a maximum value for the relative speed of the other motor vehicle to the own motor vehicle. If $v_a$ is outside the circle $v_{a\_max}$, the associated other motor vehicle is not suitable for selection.

Figure 11:
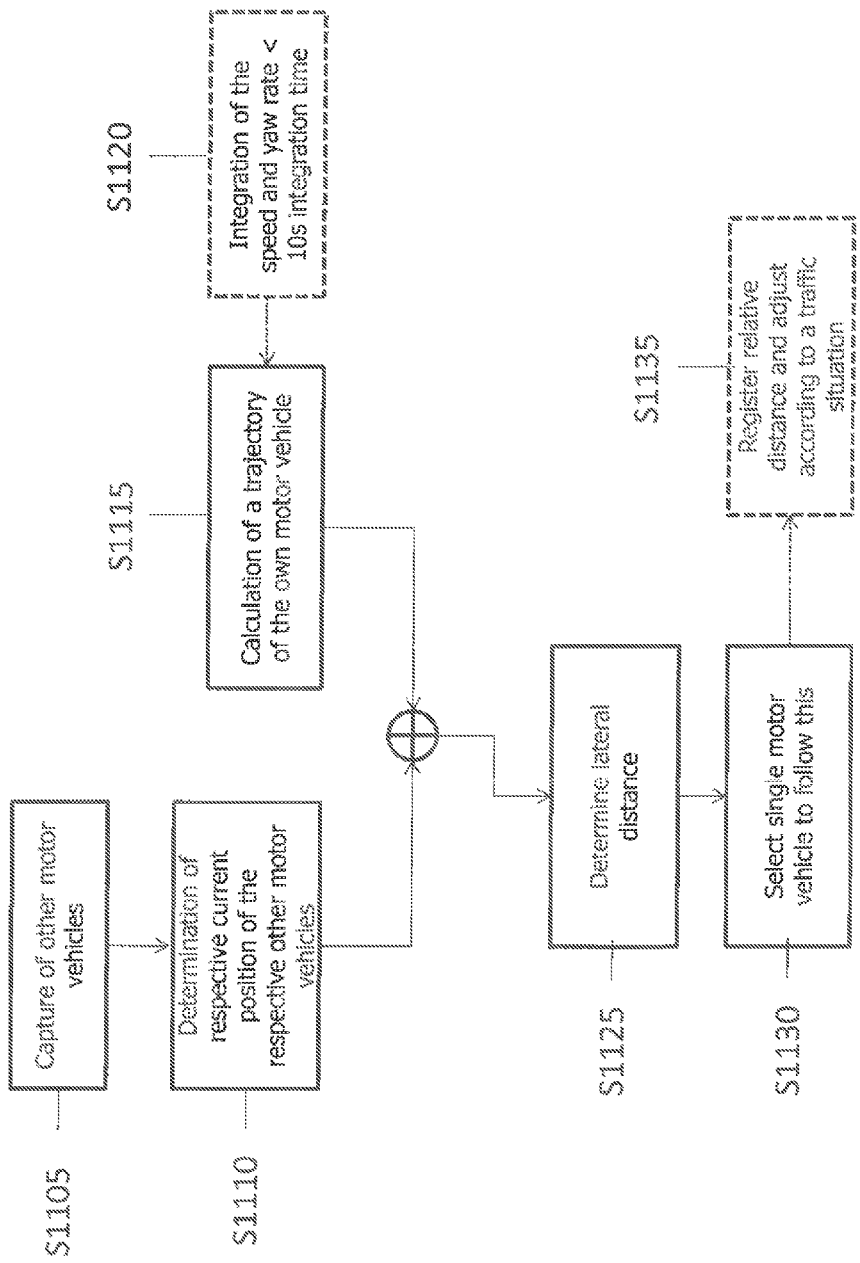
FIG. 11 a schematic representation of a flow chart according to an exemplary embodiment of the present invention.

FIG. 11 shows a schematic representation of a flow chart according to an exemplary embodiment of the present invention. Other motor vehicles participating in the traffic ahead of the own motor vehicle are identified by at least one environmental sensor, S1105. A respective position of the other motor vehicles is determined by the at least one environmental sensor, S1110. A trajectory of the own motor vehicle is determined from a current speed and a current yaw rate of the own motor vehicle, S1115. The trajectory can be determined by integration of the speed and the yaw rate over a predetermined time, for example a time of up to 10 seconds. Then a single motor vehicle is selected from the other motor vehicles, S1130. The selection is based on a shortest distance to the trajectory, S1125. The other motor vehicle is followed by the own motor vehicle. Optionally, S1135, a relative distance between the own motor vehicle and the single motor vehicle can be detected. This distance can then be adjusted between the own motor vehicle and the single motor vehicle according to a traffic situation. Optionally a respective shortest distance of the other motor vehicles to the trajectory can be compared with the shortest distance of the single motor vehicle, if the comparison has then revealed that another motor vehicle is located closer to the trajectory, this is selected in order to follow this. The single motor vehicle is then saved for a possible later selection. A possible later selection enables a possible incorrect selection to be rectified again later. This saving enables a user or the system to mark the single motor vehicle as suitable or to follow this in a later selection.

In addition, a manual input of a user can be processed, wherein the single vehicle is deselected by the manual selection of one of the other motor vehicles in order to follow this. Deselection helps the driver to find a remedy himself in the event of an incorrect selection by the system or to select another desired driving route, following the other motor vehicle, which route was not originally envisaged for the journey. The system can also decide whether such a manual input of the user is permissible.

The invention claimed is:

1. Control system adapted and determined for use in a motor vehicle to identify motor vehicles driving in front based on environmental data obtained by at least one environmental sensor associated with the motor vehicle, wherein the at least one environmental sensor is adapted to provide the environmental data, which represents the area in front of the motor vehicle, to an electronic control of the control system, and wherein the control system is at least adapted and determined to
   capture another motor vehicle participating in the traffic with the at least one environment sensor (S405),
   determine positions of the other motor vehicle for a predetermined time interval (S410),
   determine at the end of the time interval whether
      a) current position (S415) of the own motor vehicle lies ahead of at least one of the determined positions of the other motor vehicle;
      b) a lateral distance (S420) between a respectively next position of the determined positions of the other motor vehicle ahead of and behind the current position of the own motor vehicle does not exceed a predetermined value; and
      c) a number of the determined positions of the other motor vehicle (S425), which are located ahead of the current position of the own motor vehicle, exceeds a predetermined minimum number;
   if it was determined that a), b) and c) have been fulfilled (S430), estimating a trajectory from the determined positions of the other motor vehicle (S435), and
   selecting the other motor vehicle (S445) in order to follow this based on a deviation measurement (S440) between the estimated trajectory of the other motor vehicle and a trajectory of the own motor vehicle.

2. Control system according to claim 1, wherein the deviation measurement between the estimated trajectory and the trajectory of the own motor vehicle is below a predetermined threshold value.

3. Control system according to claim 1, wherein the deviation measurement for a minimum length of the trajectory of the own motor vehicle is fallen below.

4. Control system according to claim 3, wherein the minimum length lies above a predetermined threshold value based on a current distance between the own and the other motor vehicle.

5. Control system according to claim 3, wherein the current distance between the own and the other motor vehicle is smaller than the minimum length.

6. Control system according to claim 1, which is further adapted and determined to further select the participating other motor vehicle, in order to follow this, if a) a current distance (S450) between the own and the other motor vehicle is below a predetermined threshold value;

b) the error in the estimated trajectory (S455) is below a predetermined threshold value;

c) the curvature of the estimated trajectory (S460) is below a predetermined threshold; and/or d) the relative speed (S465) between the other motor vehicle and the own motor vehicle is below a predetermined threshold value.

7. Control method, which in a motor vehicle identifies motor vehicles driving in front based on environmental data obtained by at least one environmental sensor associated with the motor vehicle, with the steps:

providing an electronic control in the own vehicle by means of the environmental sensors with environmental data reproducing the area in front of the motor vehicle, detecting another motor vehicle participating in the traffic with the at least one environmental sensor, determining positions of the other motor vehicle for a predetermined time interval, determining at the end of the time interval whether a) a current position of the own motor vehicle lies ahead of at least one of the determined positions of the other motor vehicle;

b) a lateral distance between a respectively next position of the determined positions of the other motor vehicle ahead of and behind the current position of the own motor vehicle does not exceed a predetermined value; and c) a number of the determined positions of the other motor vehicle, which are located ahead of the current position of the own motor vehicle, exceeds a predetermined minimum number;

if it was determined that a), b) and c) have been fulfilled, estimating a trajectory from the determined positions of the other motor vehicle, and selecting the other motor vehicle in order to follow this based on a deviation measurement between the estimated trajectory of the other motor vehicle and a trajectory of the own motor vehicle.

8. Control method according to claim 7, wherein the deviation measurement between the estimated trajectory of the own motor vehicle is below a predetermined threshold value.

9. Control method according to claim 7, wherein the deviation measurement for a minimum length of the trajectory of the own motor vehicle is fallen below.

10. Control method according to claim 9, wherein the minimum length lies above a predetermined threshold value based on a current distance between the own and the other motor vehicle.

11. Control method according to claim 9, wherein the current distance between the own and the other motor vehicle is smaller than the minimum length.

12. Control method according to claim 7, with the step:

to further select the participating other motor vehicle, in order to follow this, if a) a current distance between the own and the other motor vehicle is below a predetermined threshold value;

b) the error in the estimated trajectory of the other motor vehicle is below a predetermined threshold value;

c) the curvature of the estimated trajectory of the other motor vehicle is below a predetermined threshold; and/or d) the relative speed between the other motor vehicle and the own motor vehicle is below a predetermined threshold value.

\* \* \* \* \*

UNITED STATES PATENT AND TRADEMARK OFFICE
CERTIFICATE OF CORRECTION

PATENT NO. : 9,975,558 B2  
APPLICATION NO. : 15/659658  
DATED : May 22, 2018  
INVENTOR(S) : Richard Altendorfer et al.

Page 1 of 1

It is certified that error appears in the above-identified patent and that said Letters Patent is hereby corrected as shown below:

In the Claims

Column 10, Line 28 reads "environment" should read --environmental--

Column 10, Line 32 reads "current" should read --a current--

Column 12, Line 9 reads "trajectory of" should read --trajectory and the trajectory of--

Signed and Sealed this  
Seventh Day of August, 2018

Andrei Iancu  
*Director of the United States Patent and Trademark Office*